United States Patent
Ishikawa

(10) Patent No.: US 6,799,489 B2
(45) Date of Patent: Oct. 5, 2004

(54) WAVE GEARING WITH THREE-DIMENSIONAL DEVIATEDLY MESHED TOOTH PROFILE

(75) Inventor: Shoichi Ishikawa, Kanagawa-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 10/380,704
(22) PCT Filed: Mar. 26, 2002
(86) PCT No.: PCT/JP02/02940
§ 371 (c)(1),
(2), (4) Date: Mar. 17, 2003
(87) PCT Pub. No.: WO02/079667
PCT Pub. Date: Oct. 10, 2002

(65) Prior Publication Data
US 2003/0159539 A1 Aug. 28, 2003

(51) Int. Cl.⁷ .................................................. F16H 1/32
(52) U.S. Cl. ............................. 74/640; 74/461; 74/462
(58) Field of Search ............................ 74/640, 461, 462

(56) References Cited

U.S. PATENT DOCUMENTS

| | | | |
|---|---|---|---|
| 2,906,143 A | * | 9/1959 | Musser ........................ 74/640 |
| 4,703,670 A | * | 11/1987 | Kondo ......................... 74/640 |
| 5,662,008 A | * | 9/1997 | Aubin et al. .................. 74/640 |
| 5,782,143 A | * | 7/1998 | Ishikawa ...................... 74/640 |
| 5,918,508 A | * | 7/1999 | Ishikawa ...................... 74/640 |
| 6,167,783 B1 | * | 1/2001 | Ishikawa ...................... 74/640 |
| 6,230,587 B1 | * | 5/2001 | Grill ........................... 74/640 |
| 6,467,375 B1 | * | 10/2002 | Ishikawa ...................... 74/640 |
| 6,526,849 B1 | * | 3/2003 | Ishikawa ...................... 74/640 |

FOREIGN PATENT DOCUMENTS

| | | |
|---|---|---|
| JP | 45-41171 | 12/1970 |
| JP | 5-209655 | 8/1993 |
| JP | 2000-136851 | 5/2000 |

* cited by examiner

Primary Examiner—Richard M. Lorence
(74) Attorney, Agent, or Firm—Burns, Doane, Swecker & Mathis, L.L.P.

(57) ABSTRACT

In a principal section of the flexible external gear of a wave gear drive, a position away from the major axis of an elliptically shaped neutral line of the rim of the flexible external gear is defined as the center position of the teeth meshing, and $\theta$ is the angle of inclination of the tangent of that position with a point along the neutral line of the rim. The amount of flexing w of the principal section is defined according to the angle of inclination $\theta$, the number of teeth $z_F$ of the flexible external gear, the number of teeth $z_C$ of the rigid internal gear, radius $r_o$ of the pitch circle of the flexible external gear, and the radius $r_n$ of the neutral curve of the rim prior to deformation. Thereby, the tangential direction common to both tooth profiles at the point of the contact between the tooth profiles of the two gears at the center position of the main meshing region within the principal section is made to coincide with the tangential direction at the said point of the contact of the curves of the linear generatrix of the neutral cylindrical plane of the rim projected on the principal section, enabling continuous contact between the two gears in the direction of the tooth trace. Using the tooth profile concerned makes it possible to alleviate stresses on the tooth bottom rim of the flexible external gear and the inner rolling contact surface of the wave generator, particularly those arising at points in the vicinity of the major axis.

3 Claims, 5 Drawing Sheets

WAVE GEARING WITH THREE-DIMENSIONAL DEVIATEDLY MESHED TOOTH PROFILE

TECHNICAL FIELD

The present invention relates to tooth profiles of a rigid internal gear and a flexible external gear of a wave gear drive. More particularly, this relates to tooth profiles applied to both gears to avoid superimposition of bending stress produced by elliptical deformation of the rim of the flexible external gear in the vicinity of the major axis and rim tensile stress produced by the load on the tooth surface, and to equalize and reduce stress on the tooth bottom rim of the flexible external gear and wave generator ball load.

BACKGROUND ART

A typical wave gear drive has a rigid circular internal gear, a cup-shaped flexible external gear disposed inside the rigid internal gear, and a wave generator that flexes the flexible external gear into an elliptical shape to mesh the two gears at each end of the elliptical major axis and rotates the mesh portions in the circumferential direction. The cup-shaped flexible external gear comprises a flexible cylindrical body, an annular diaphragm formed continuously with one end of the cylindrical body to extend radially inward, an annular boss formed integrally with the center of the diaphragm, and external teeth formed on the outer periphery at the other end of the cylindrical body.

The wave generator has an elliptical profile and is located inside the cylindrical body on which the external teeth are formed, producing a state in which the portion on which the external teeth are formed is flexed into an elliptical shape. Therefore, the cylindrical body is flexed into an elliptical shape with the amount of flexing from the diaphragm side toward the open end on which the external teeth are formed being approximately proportional to the distance from the diaphragm. The difference in the number of teeth the two gears have is 2n (n: positive integer); the difference is normally two teeth.

When the wave generator is rotated at high speed by a motor or the like, the mesh portions of the two gears are moved in the circumferential direction, and the rotation, the speed of which is greatly reduced in accordance with the difference in the number of teeth the two gears have, is taken off from the flexible external gear or rigid internal gear.

Here, the flexible external gear is what is known as a silk-hat-shaped flexible external gear. This flexible external gear has a configuration in which, from the one end of the cylindrical body, the annular diaphragm widens in a radially outward direction, and a thick, annular boss is formed integrally on the outer edge of the diaphragm. In this case, the cylindrical body is flexed into an elliptical shape with the amount of flexing produced from the diaphragm side toward the open end on which the external teeth are formed being approximately proportional to the distance from the diaphragm.

Since the invention by C. W. Musser (U.S. Pat. No. 2,906,143), the original inventor of the wave gear drive, there have been various inventions by many researchers, including Musser and the present inventor. Even with respect just to the tooth profiles, there are various inventions. Among these, the present inventor proposed a method of designing a tooth profile in which the addendum profiles for wide contact between the rigid internal gear and flexible external gear are derived using a rack approximation of the meshing between the two gears. Since then, too, the present inventor and other researchers have made many inventions relating to tooth profiles.

At present there is a strong market demand for wave gear drives having improved performance. Especially, improved load capabilities are desired. The main elements governing load capabilities of wave gear drives are the tooth bottom rim of the flexible external gear and the inner rolling contact surface of the wave generator, particularly the fatigue strength at locations in the vicinity of the major axis thereof. The object of the present invention is to reduce the stresses produced at these two locations.

DISCLOSURE OF THE INVENTION

The present invention uses the following two techniques to attain the above object. The first is, with respect to realizing continuous meshing in the direction of the tooth trace of unmodified spur gears used in a cup-shaped or silk-hat-shaped flexible external gear, which hitherto has been considered impossible, to reduce the tooth bottom rim stress by extending the tooth contact in the direction of the tooth trace, by setting the pressure angle according to the main meshing point and amount of flexing of the flexible external gear.

The second is, at the meshing between the teeth of the two gears in a section perpendicular to the flexible external gear axis (principal section) selected at an arbitrary point in a direction of the tooth trace, with the flexing of the flexible external gear reduced from the normal to a negative deviation the main part of the tooth meshing region separates from the vicinity of the major axis of the ellipse, and by applying the Euler-Savary equation established at the variable speed ratio gear to the tooth profile design, continuous contact of tooth profiles in the principal section is realized.

By using the two techniques in combination, the present invention prevents superimposition of bending stress produced by elliptical deformation of the rim of the flexible external gear in the vicinity of the major axis and rim tensile stress produced by the load on the tooth surfaces, and helps to equalize and reduce stress on the tooth bottom rim of the flexible external gear and wave generator ball load.

A wave gear drive having a rigid internal gear, a cup-shaped or silk-hat-shaped flexible external gear disposed inside the rigid internal gear, and a wave generator that flexes sections of the flexible external gear perpendicular to an axis thereof into an elliptical shape such that the amount of flexing increases from a diaphragm side thereof toward an opening portion thereof approximately in proportion to distance from the diaphragm, and rotates that shape, the rotation of the wave generator producing relative rotation between the two gears, wherein a main portion of the tooth profiles of the two gears is defined as follows.

First, the basic flexible external gear and rigid internal gear are both spur gears and a number of teeth of the flexible external gear is defined as 2n (where n is a positive integer) fewer than a number of teeth of the rigid internal gear.

Also, with a principal section defined as a section perpendicular to the flexible external gear selected at an arbitrary point in the direction of the tooth trace, in this principal section, taking as a teeth-meshing center position a position on a neutral line of the elliptical rim of the flexible external gear away from the major axis, by assigning θ as the angle of inclination of a tangent with that position along the neutral line of the rim, $z_F$, $z_C$ as the number of teeth on the flexible external gear and rigid internal gear, respectively, $r_o$, $r_n$ as, respectively, the diameter of the pitch circle of the flexible external gear and the radius of the neutral curve of the rim prior to deformation and the amount of flexing of the principal section as w in Equation (4)

$$w = \frac{-b - \sqrt{b^2 - 4ac}}{2a} \tag{4}$$

$$a = \frac{3z_F}{r_n}\cos(2\theta)$$

$$b = z_C - z_F + 3z_F\frac{r_o}{r_n}\cos^2(2\theta) - z_C\sqrt{1 + 3\cos^2(2\theta)} \times$$

$$[2\sin\{\tan^{-1}(\cot^3\theta) + \theta\} - \sin(2\theta)\cos\{\tan^{-1}(\cot^3\theta) - \theta\}]$$

$$c = r_o(z_C - z_F)\cos(2\theta)$$

tangential direction common to both tooth profiles at the point of the contact between the tooth profiles of the two gears at the center position of the main meshing region within the principal section is made to coincide with the tangential direction at the said point of the contact of the curves of the linear generatrix of the neutral cylindrical plane of the rim projected on the principal section, effecting continuous contact in the tooth trace direction.

The center of the radius of curvature of each of the two tooth profiles at the point of the meshing contact in the principal section is set based on the Euler-Savary equation established at the variable speed ratio gear.

Thereby, a state of continuous meshing of the tooth profiles is formed at the principal section of the flexible external gear, at a meshing region away from the major axis.

With respect to the tooth profiles at the sections perpendicular to the axes of the two gears, when the main part of the concave tooth profile of the rigid internal gear is given an involute curvature and the main part of the convex tooth profile of the flexible external gear is an arc, the radius of the arc can be set at up to a radius of curvature determined by the Euler-Savary equation established at the variable speed ratio gear in the principal section.

Also with respect to the tooth profiles at the sections perpendicular to the axes of the two gears, when the main part of the concave tooth profile of the rigid internal gear and the main part of the convex tooth profile of the flexible external gear are both formed as arcs, the radius of the concave tooth profile of the rigid internal gear can be set at or above, and the radius of the convex tooth profile of the flexible external gear can be set at or below, the radius of curvature of the arc radii determined by the Euler-Savary equation established at the variable speed ratio gear in the principal section.

BEST MODE FOR CARRYING OUT THE INVENTION

A method of setting the tooth profiles of the two gears of a wave gear drive according to the present invention is described in the following, with reference to the drawings.

Figure 1:
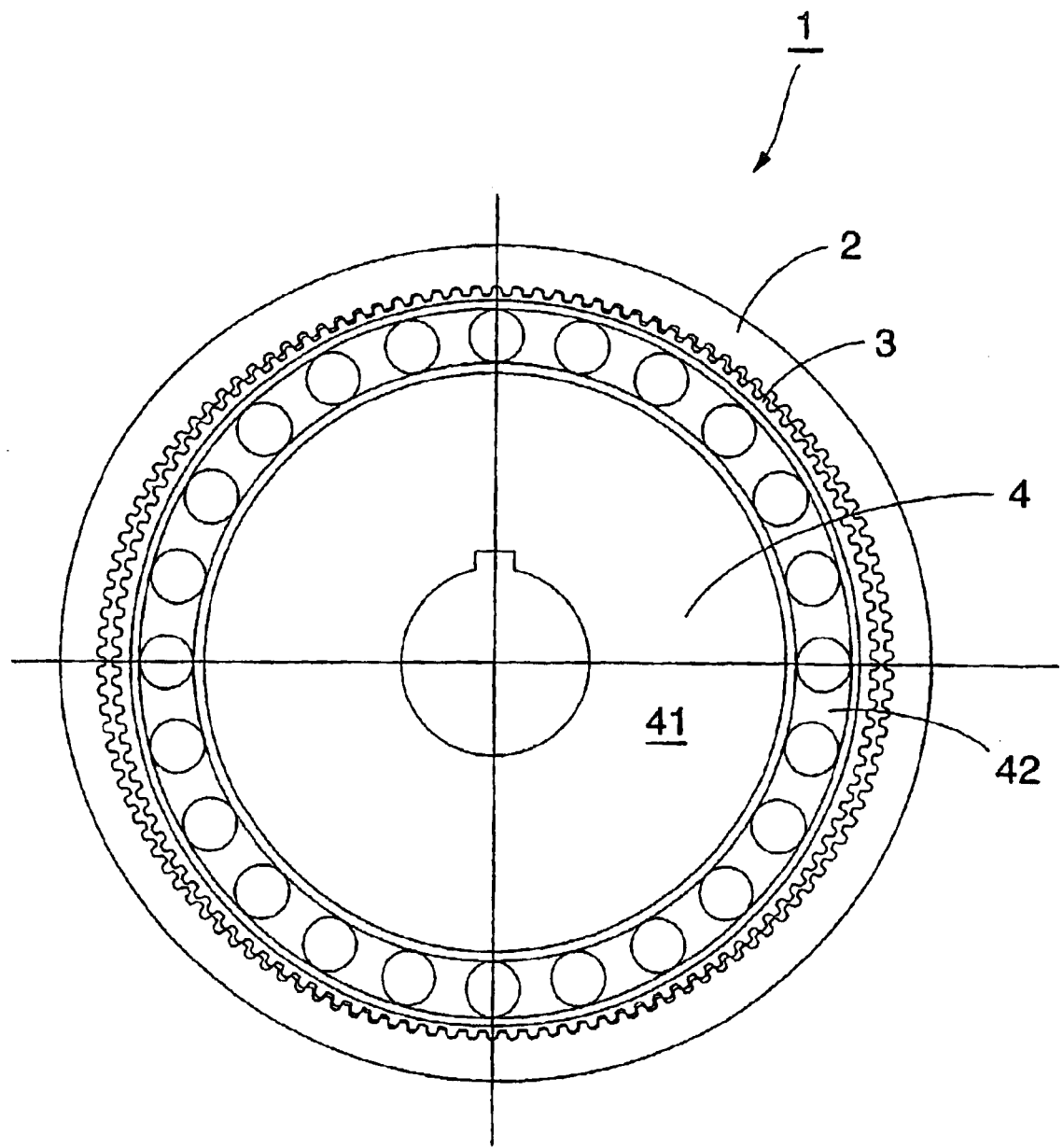
FIG. 1 shows a front view of an example of a typical wave gear drive.

First, FIG. 1 shows a front view of a typical wave gear drive. In this wave gear drive 1 the difference in the number of teeth on flexible external gear 3 and rigid internal gear 2 is two (n=1). Set inside the flexible external gear 3 is a wave generator 4 with an elliptical profile. The wave generator 4 comprises a rigid cam plate 41 that has an elliptical profile, and a wave bearing 42 fitted onto the outer peripheral surface thereof.

Figure 2:
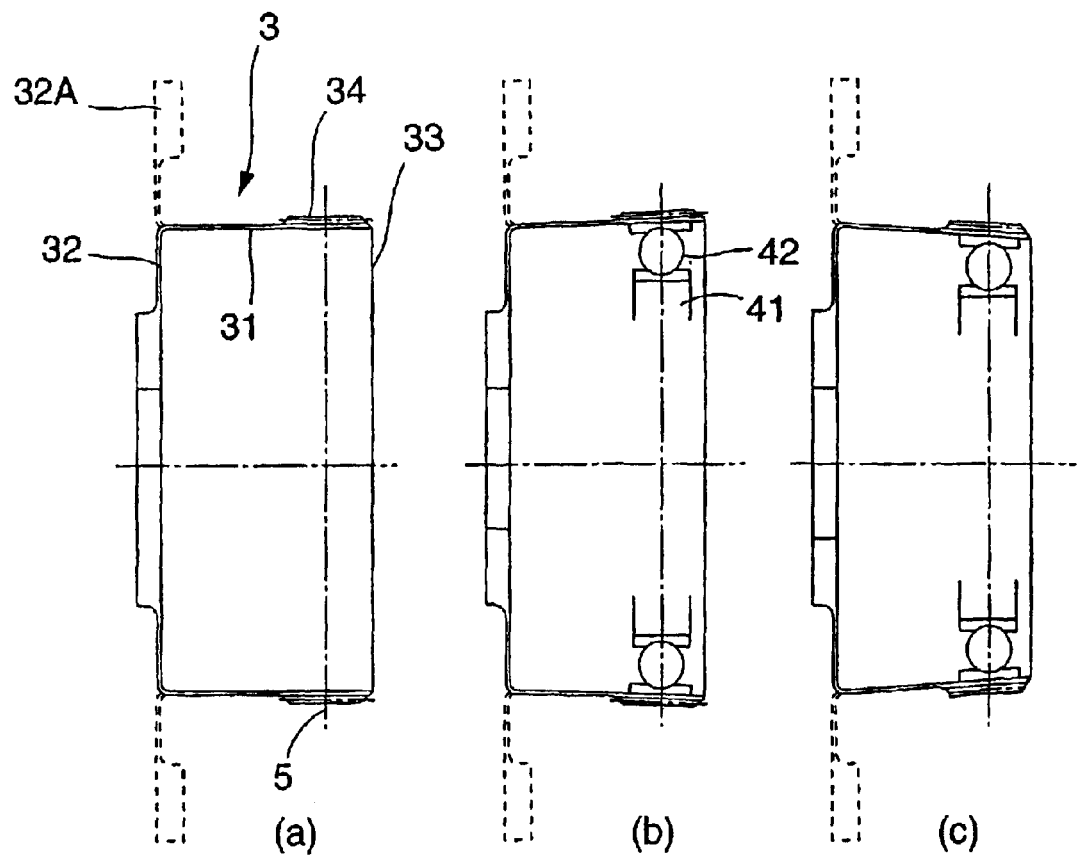
FIG. 2 shows explanatory views of flexing of a cup-shaped or silk-hat-shaped flexible external gear at a section including the axis, with (a) being the state before deformation, (b) being a section that includes the major axis of the gear, and (c) being a section that includes the minor axis of the gear.

FIG. 2 shows an opening portion of the flexible external gear 3 flexed into an elliptical shape at a section including the axis, with (a) being the shape before deformation, (b) being a section that includes the major axis of the ellipse, and (c) being a section that includes the minor axis of the ellipse. The flexible external gear 3 comprises a cylindrical body 31, an annular diaphragm 32 formed continuously with one end thereof, and external teeth 34 formed on an outer peripheral surface portion at the other end of the body, the opening portion 33 end. In the case of a flexible external gear that is cup-shaped, the diaphragm 32 extends radially inward from the body 31, as shown by a solid line; if the flexible external gear is silk-hat-shaped, the diaphragm 32A extends radially outward from the body 31, as shown by a broken line.

Next, in this wave gear drive 1, with the difference between the number of teeth of the rigid internal gear and the flexible external gear $z_C - z_F$ being 2n (n being a positive integer), it is assumed that the shape of the neutral curve of the rim of the flexible external gear is an approximated ellipse given by the tangential polar coordinates of the following Equation (1), obtained by superimposing on a true circle of radius $r_n$ an n-wavelength wave having a total amplitude of 2 Km (K being a flexing coefficient and m being a module). The method of setting the tooth profiles of the two gears in this case will now be explained with reference to FIGS. 3 to 5.

$$p = r_n + w\cos(2\theta)\ (0 \leq \theta \leq 2\pi) \tag{1}$$

Here, p: Length of vertical line from coordinate origin O to tangent on neutral line of rim $r_n$: Radius of true circle prior to deformation of neutral line of rim w: Amount of flexing on major and minor axes of neutral line of rim (w=Km)

θ: Slope angle of tangent (normal) on neutral line of rim to minor axis (major axis)

The flexing coefficient K has the following significance. The value $do = mz_F/R = m(z_c - z_F)$ of the pitch circle diameter $mz_F$ of the flexible external gear divided by the reduction ratio R $(=z_F/(z_C - z_F))$ is called the normal amount of flexing, a state in which there is a larger amount of flexing than the normal amount is called positive deviation, a state in which there is a smaller amount of flexing is called negative deviation, and a state in which there is a normal amount of flexing is called non-deviation. Flexing coefficient K is a value obtained by dividing the amount of flexing d in each case by the normal amount of flexing do. That is, K>1 is positive deviation, K=1 is non-deviation, and K<1 is negative deviation.

Figure 3:
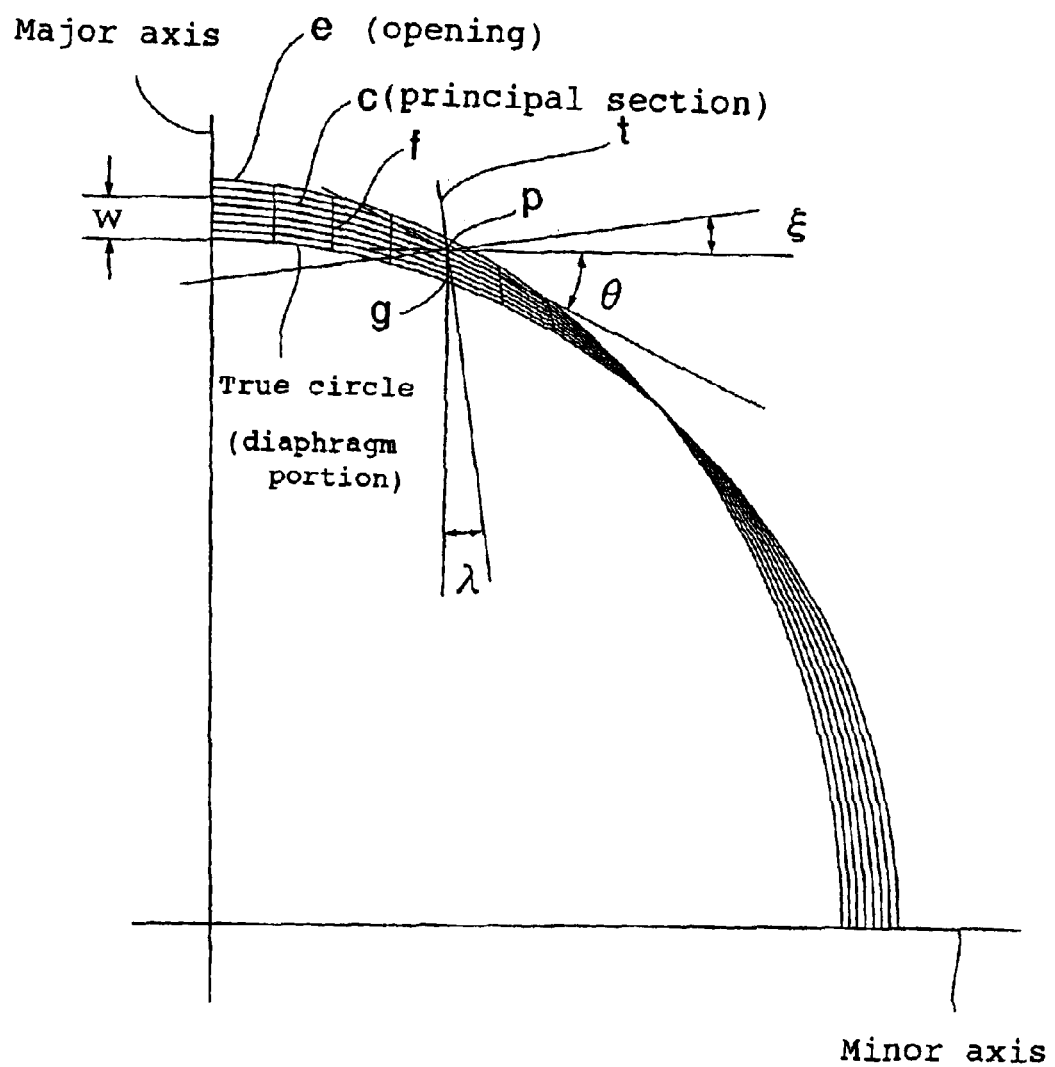
FIG. 3 is an explanatory view of a method of realizing tooth contact in the direction of the tooth trace.

FIG. 3 shows neutral curves on a plurality of sections perpendicular to the axis that includes the principal section (for example, the position of the section perpendicular to the axis shown in FIG. 2 by line segment 5) from the opening portion of the neutral curved surface of the body of the flexible external gear to the diaphragm portion, projected axially onto the principal section. In the drawing, the true circle is the diaphragm portion, curve c is the principal section, curve e shows the projected rim neutral curve section of the opening portion, and w shows the amount of flexing of the principal section determined for the two gears $z_C$, $z_F$. The plurality of curves f shown in the drawing is the projection of a plurality of points on the cylindrical generatrix of the neutral curved surface of the rim cylinder prior to deformation (the neutral cylindrical surface of the rim).

First, at the principal section, a meshing region representative point P is determined on the rim neutral line c of the principal section, away from the major axis. The angle of inclination θ of the neutral line tangent at point P is obtained. A range of 0° to 45° is used for θ. A projected neutral generatrix g is drawn through point P and a tangent t of the projected neutral generatrix g at point P is drawn. The angle of inclination λ of the tangent t to the major axis can be obtained from the following Equation (2), using a fixed locus on the neutral line of the rim with θ as a function.

$$\lambda = \tan^{-1}\left\{\frac{\sin\theta - \cos\theta\sin(2\theta) + \frac{1}{3}\sin(3\theta)}{\cos\theta - \sin\theta\sin(2\theta) - \frac{1}{3}\cos(3\theta)}\right\} = \tan^{-1}(\tan^3\theta) \quad (2)$$

One of the principal objects of the present invention is to determine the pressure angle of both gears at which the tangent t of the projected neutral generatrix g coincides with the common tangent of the tooth profiles at the point of contact between the two gears. The basis for this is that meshing in the direction of the tooth trace can be substantially realized by locating the tooth profile of the flexible external gear along the tooth trace before and after the principal section, at a position along tangent t. That is, if this condition exists when the tooth profile of the flexible external gear is thought of as moving along the tooth trace, it becomes possible to realize meshing in the direction of the tooth trace. If this condition is not satisfied, the tooth profiles of the two gears dig in or separate with the increase in axial separation from the principal section, and it becomes impossible to obtain tooth contact in the tooth trace direction.

Figure 4:
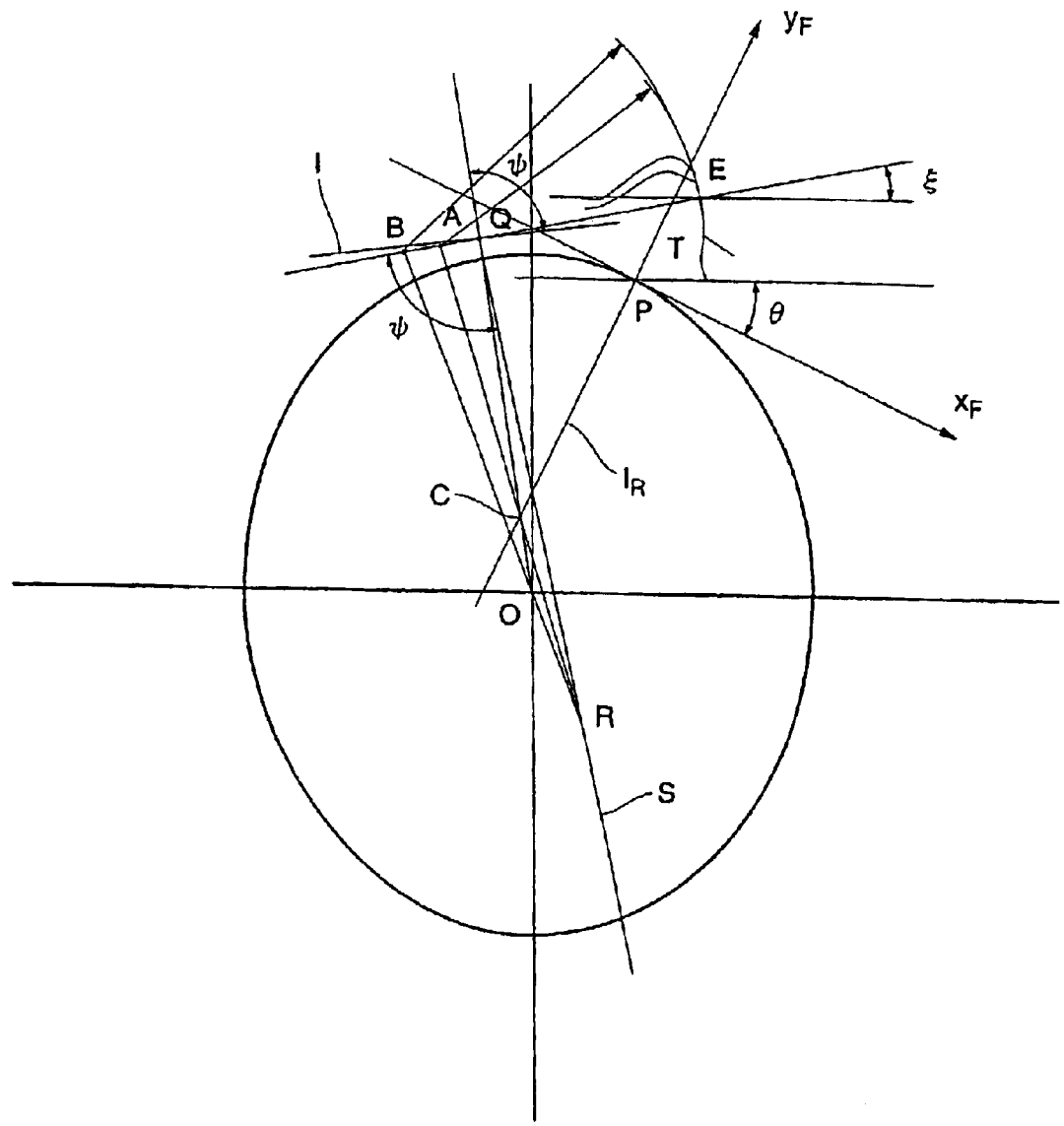
FIG. 4 is an explanatory view showing the mechanical relationship of the meshing of a flexible external gear and rigid internal gear forming the basis of the tooth profile formation.

FIG. 4 is an explanatory diagram showing the relationship of the relative motion at contact point E between the teeth of the two gears at the main meshing region of the principal section. An essential condition for meshing to occur at this point E position is that a line normal to the tooth profile of the rigid internal gear passes through the instantaneous center Q of relative motion at the time of the meshing of a tooth of the flexible external gear with the teeth of the rigid internal gear. By introducing this condition, the amount of flexing w is set as a matter of course when θ is given. That is, with the angle of inclination θ of the tangent of the neutral line of the rim and the amount of flexing w of the flexible external gear on the neutral line of the rim principal section that determines the main meshing region being related variables, the relationship between the two is derived from the following consideration.

The coordinate axes $x_F$, $y_F$ are set on a tooth T of the flexible external gear at the θ position with the origin P which is the intersection between the neutral line of the rim and the tooth center line (which coincides with the normal $l_R$ to the neutral line of the rim). A case is assumed in which the wave generator is fixed and the rigid internal gear is driven by the flexible external gear. A center of curvature C of a neutral line along the normal $l_R$ of the neutral line of the rim at point P is the instantaneous center of movement of the tooth T of the flexible external gear at that instant. The instantaneous rotational speed of the tooth T at this time can be obtained from the peripheral speed of the neutral line of the rim decided by the steady rotational speed of the flexible external gear. With the rotation of the rigid internal gear being steady, the center thereof is origin O, and as in the case of an ordinary gear, the ratio of the instantaneous rotational speed thereof to the steady rotational speed of the flexible external gear is equal to the reciprocal of the gear ratio.

Therefore, the instantaneous center Q of relative motion between the tooth T of the flexible external gear and the rigid internal gear is located at a position on the extension of the line OC where OC is divided into the reciprocal ratio of the instantaneous rotational speeds of the two gears. A line QE that connects the flexible external gear tooth contact point E and point Q is a contact normal to the profile. Based on the above, the angle ξ of the contact normal at point E to the horizontal axis can be obtained by the following Equation (3) in which h is the height of the deddendum of the flexible external gear.

$$\xi = \tan^{-1}\left\{\frac{(r_n + h + 1.5w)\cos\theta - 0.5w\cos(3\theta) - 2w\sin\xi\sqrt{1 + 3\cos^2(2\theta)}\frac{z_C}{z_C - z_F}}{(r_n + h - 1.5w)\sin\theta - 0.5w\sin(3\theta) + 2w\cos\xi\sqrt{1 + 3\cos^2(2\theta)}\frac{z_C}{z_C - z_F}}\right\} \quad (3)$$

Here, by assigning the condition ξ=λ, the relationship between the above w and θ can be obtained by the following Equation (4).

$$w = \frac{-b - \sqrt{b^2 - 4ac}}{2a} \quad (4)$$

$$a = \frac{3z_F}{r_n}\cos(2\theta)$$

$$b = z_C - z_F + 3z_F\frac{r_o}{r_n}\cos^2(2\theta) - z_C\sqrt{1 + 3\cos^2(2\theta)} \times$$

$$[2\sin\{\tan^{-1}(\cot^3\theta) + \theta\} - \sin(2\theta)\cos\{\tan^{-1}(\cot^3\theta) - \theta\}]$$

$$c = r_o(z_C - z_F)\cos(2\theta)$$

Next, considering the fixed pitch curves (which normally correspond to the pitch circle of the gears) located on each of the gears representing the motion of the two gears that contact each other at Q, taking Ψ as the angle formed at point Q between the tangent l common to both pitch curves and OQ, a straight line s is drawn forming an angle Ψ with QE. Taking a point R on this s, lines are drawn that connect R to C and to O and are extended to intersect QE, forming respective points of intersection A and B. The present invention focuses on the fact that the Euler-Savary theorem applying at the variable speed ratio gear is that these points A and B form centers of curvature of the tooth profiles of the flexible external gear and rigid internal gear at point E. In the example shown in the drawing, a point R has been selected whereby the points A and B are both on one side of point E. In this case the tooth profile of the flexible external gear will be convex and the tooth profile of the rigid internal gear will be concave.

Based on the above, if the radii of the tooth profiles of the flexible external gear and rigid internal gear are defined as EA and EB respectively and tooth profiles are used in which A, B are the centers of the circles of curvature, according to the Euler-Savary theorem that applies at the variable speed ratio gear, conditions for meshing in the vicinity of point E will be satisfied. To prevent interference at locations away from point E, if necessary, the convex arc radius can be decreased and the concave arc radius increased. To avoid interference between tooth tips, the tooth tips of one or both can be suitably modified to realize smooth meshing.

The above method of setting the tooth profile in the principal section was also shown in a previous invention by the present inventor, but the present invention adds a new idea that also ensures tooth contact in the direction of the tooth trace.

Figure 5:
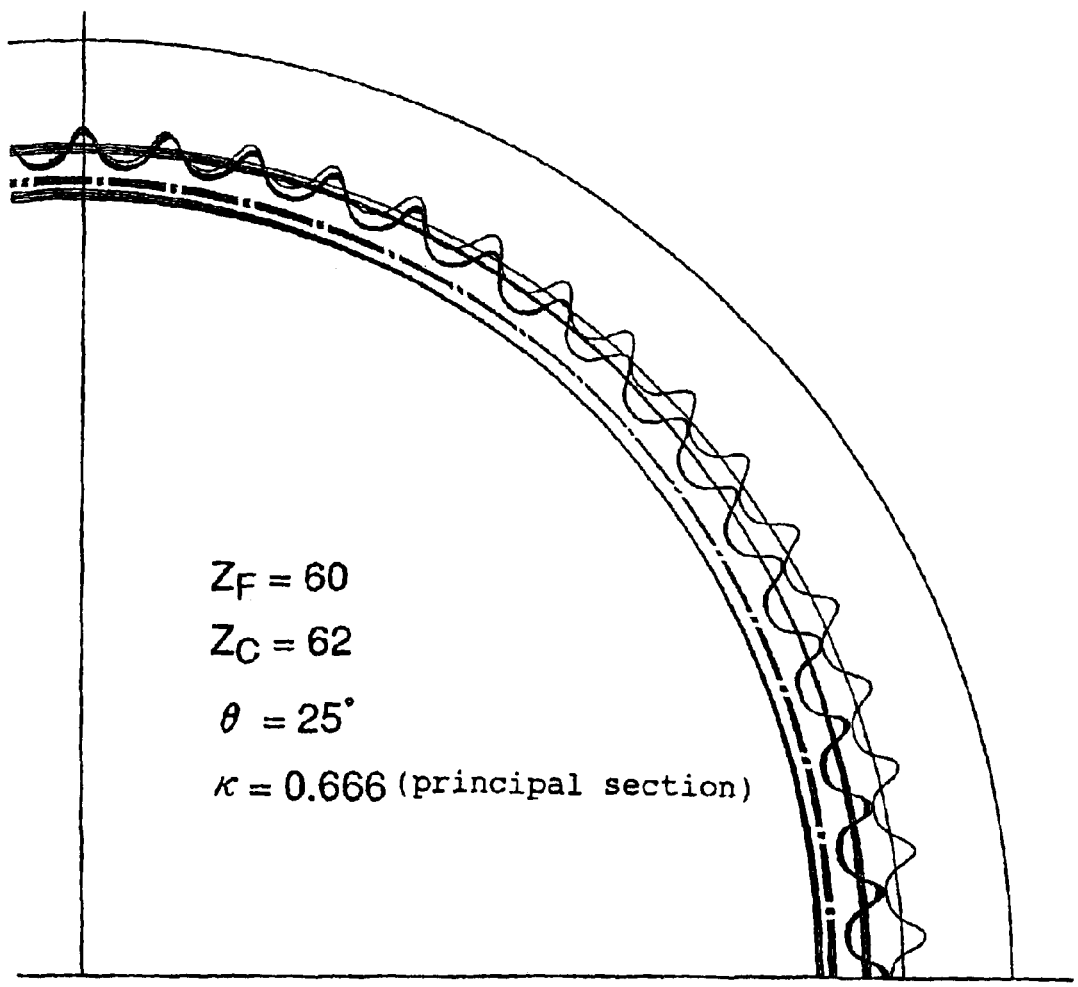
FIG. 5 shows an example of the meshing of the tooth profiles according to the present invention.

FIG. 5 shows an example of the meshing of the tooth profiles according to the present invention. In the example shown in the drawing, the numbers of teeth are $z_F=60$, $z_C=62$, the flexing coefficient of the principal section is K=0.666, and the angle showing the main meshing region is $\theta=25°$.

In accordance with the foregoing, meshing of each section that includes a principal section centers on a location away from the major axis (the location of a rim neutral line tangent of a principal section having a pre-assigned angle of inclination $\theta$). Therefore, stress produced by meshing of teeth at a principal section appears at locations at which bending stresses from the elliptical deformation is reduced, so the bending stress produced by elliptical deformation of the rim of the flexible external gear that is at a maximum at locations along the major axis, is not superimposed on stress produced by the meshing of the teeth. Combined with the effect of the increased tooth contact in the direction of the tooth trace, this increases the load capability of the flexible external gear.

In the present invention, moreover, the radial load component acting on the teeth acts on the wave generator balls under the teeth, having a good effect on the load distribution on the wave generator balls. That is, as with respect to the inner ring of the wave generator, it is possible to avoid the bending stress produced by the elliptical deformation, which are at a maximum in the vicinity of the major axis, being superimposed on the ball load at those locations.

Industrial Applicability

As described in the foregoing, in accordance with the present invention, tooth contact along the tooth trace can be realized, and by setting the main region at which meshing between the teeth of the two gears takes place in the principal section at a position away from the major axis of the elliptically-shaped flexible external gear and utilizing the Euler-Savary theorem established at the variable speed ratio gear in the designing of the tooth profiles, continuous contact of tooth profiles is possible within the principal section. Therefore, based on these effects, it is possible to achieve a major improvement in the load capability of the wave gear drive by reducing stress produced in the rim of the flexible external gear by the meshing of the teeth, avoiding the bending stress in the vicinity of the major axis produced by the elliptical deformation from being superimposed on tensile stress produced by the meshing of the teeth, and avoiding a distribution of the wave generator ball load in which the maximum load values are distributed in the vicinity of the major axis.

Also, using the Euler-Savary theorem established at the variable speed ratio gear enables meshing of convex and concave tooth profiles that reduces tooth surface pressure, thereby improving the tooth lubrication function and increasing the durability of the drive.

What is claimed is:

1. A wave gear drive having
a rigid internal gear,
a cup-shaped or silk-hat-shaped flexible external gear disposed inside the rigid internal gear, and
a wave generator that flexes sections of the flexible external gear perpendicular to an axis thereof into an elliptical shape such that the amount of flexing increases from a diaphragm side thereof toward an opening portion thereof approximately in proportion to distance from the diaphragm, meshes end portions in a major axial direction of the elliptically flexed flexible external gear with the rigid internal gear and moves the meshed portions of the two gears in a circumferential direction, the wave generator rotation producing relative rotation between the two gears, the wave gear drive being characterized in that
the flexible external gear and rigid internal gear are both spur gears,
a number of teeth of the flexible external gear is $2n$ (where n is a positive integer) fewer than a number of teeth of the rigid internal gear,
defining a principal section as a section perpendicular to the flexible external gear selected at an arbitrary point in the direction of the tooth trace,
taking as a teeth-meshing center position within the principal section a position on a neutral line of an elliptical rim of the flexible external gear away from the major axis,
assigning $\theta$ as an angle of inclination of a tangent with that position along the neutral line of the rim,
$z_F$, $z_C$ as a number of teeth on the flexible external gear and rigid internal gear, respectively, $r_o$, $r_n$ as, respectively, a diameter of a pitch circle of the flexible external gear and a radius of a neutral curve of the rim prior to deformation, and
giving an amount of flexing w of the principal section by the Equation (4)

$$w = \frac{-b - \sqrt{b^2 - 4ac}}{2a} \quad (4)$$

$$a = \frac{3z_F}{r_n}\cos(2\theta)$$

$$b = z_C - z_F + 3z_F\frac{r_o}{r_n}\cos^2(2\theta) - z_C\sqrt{1 + 3\cos^2(2\theta)} \times$$
$$[2\sin\{\tan^{-1}(\cot^3\theta) + \theta\} - \sin(2\theta)\cos\{\tan^{-1}(\cot^3\theta) - \theta\}]$$

$$c = r_o(z_C - z_F)\cos(2\theta)$$

a tangential direction common to both tooth profiles at a point of contact between the tooth profiles of the two gears at a center position of a main meshing region within the principal section is made to coincide with the tangential direction at said point of contact of the curves of the linear generatrix of the neutral cylindrical plane of the rim projected on the principal section, effecting continuous contact in the tooth trace direction,
setting a center of a radius of curvature of each of the two tooth profiles at the point of meshing contact in the principal section based on a Euler-Savary equation established at the variable speed ratio gear,
whereby a state of continuous meshing of the tooth profiles is produced at the principal section of the flexible external gear, at a meshing region away from the major axis.

2. A wave gear drive according to claim 1, characterized in that, with respect to the tooth profiles at the sections perpendicular to the axes of the two gears, when the main part of the concave tooth profile of the rigid internal gear is given an involute curve and the main part of the convex tooth profile of the flexible external gear is a circular arc, a radius of the circular arc can be set at up to a radius determined by the Euler-Savary equation established at the variable speed ratio gear in the principal section.

3. A wave gear drive according to claim 1, characterized in that, with respect to the tooth profiles at the sections perpendicular to the axes of the two gears, when the main part of the concave tooth profile of the rigid internal gear and the main part of the convex tooth profile of the flexible external gear are both formed as circular arcs, a radius of the concave tooth profile of the rigid internal gear can be set at or above, and the radius of the convex tooth profile of the flexible external gear can be set at or below, each radius of curvature determined by the Euler-Savary equation established at the variable speed ratio gear in the principal section.

* * * * *